No. 786,161. Patented March 28, 1905.

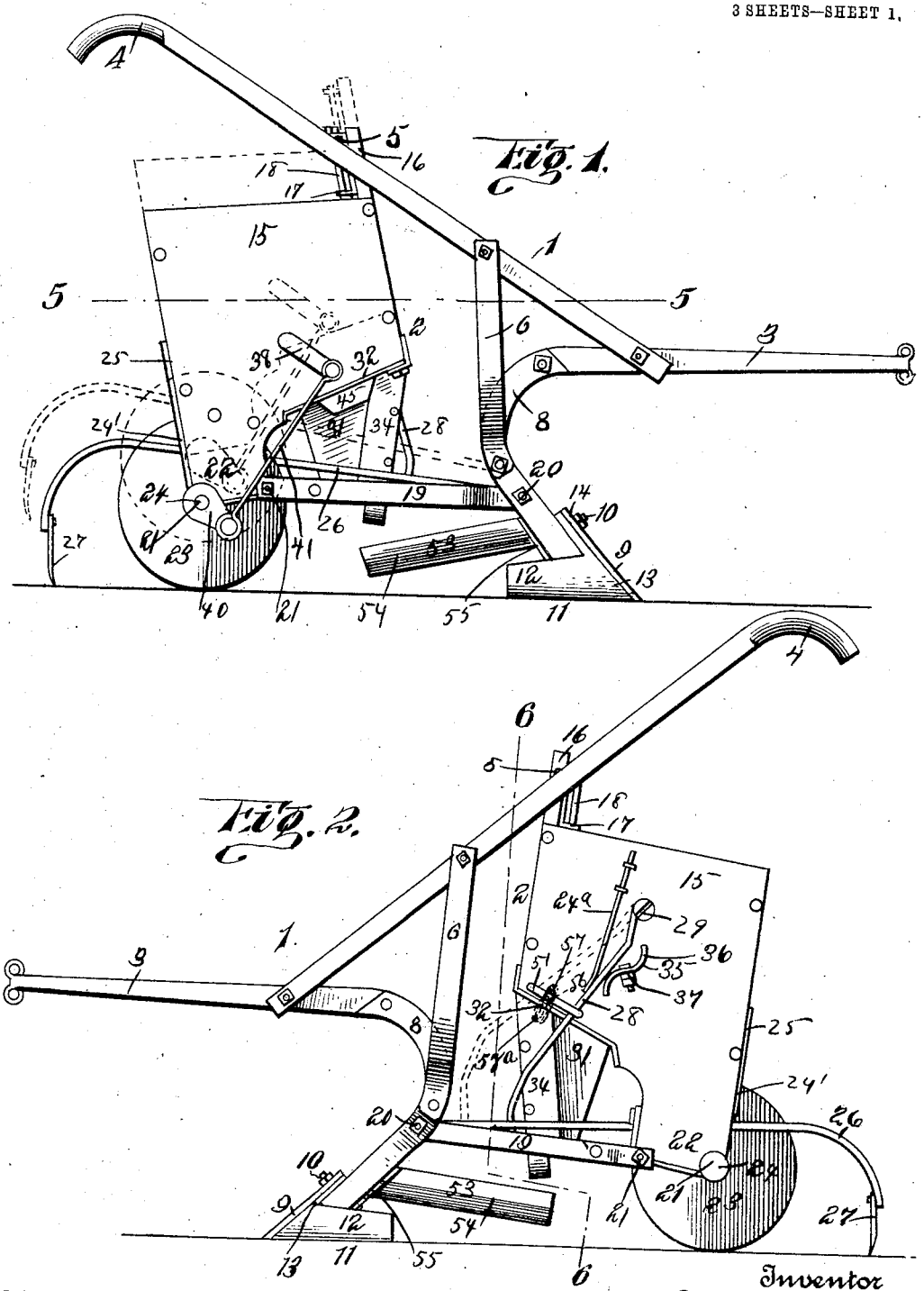

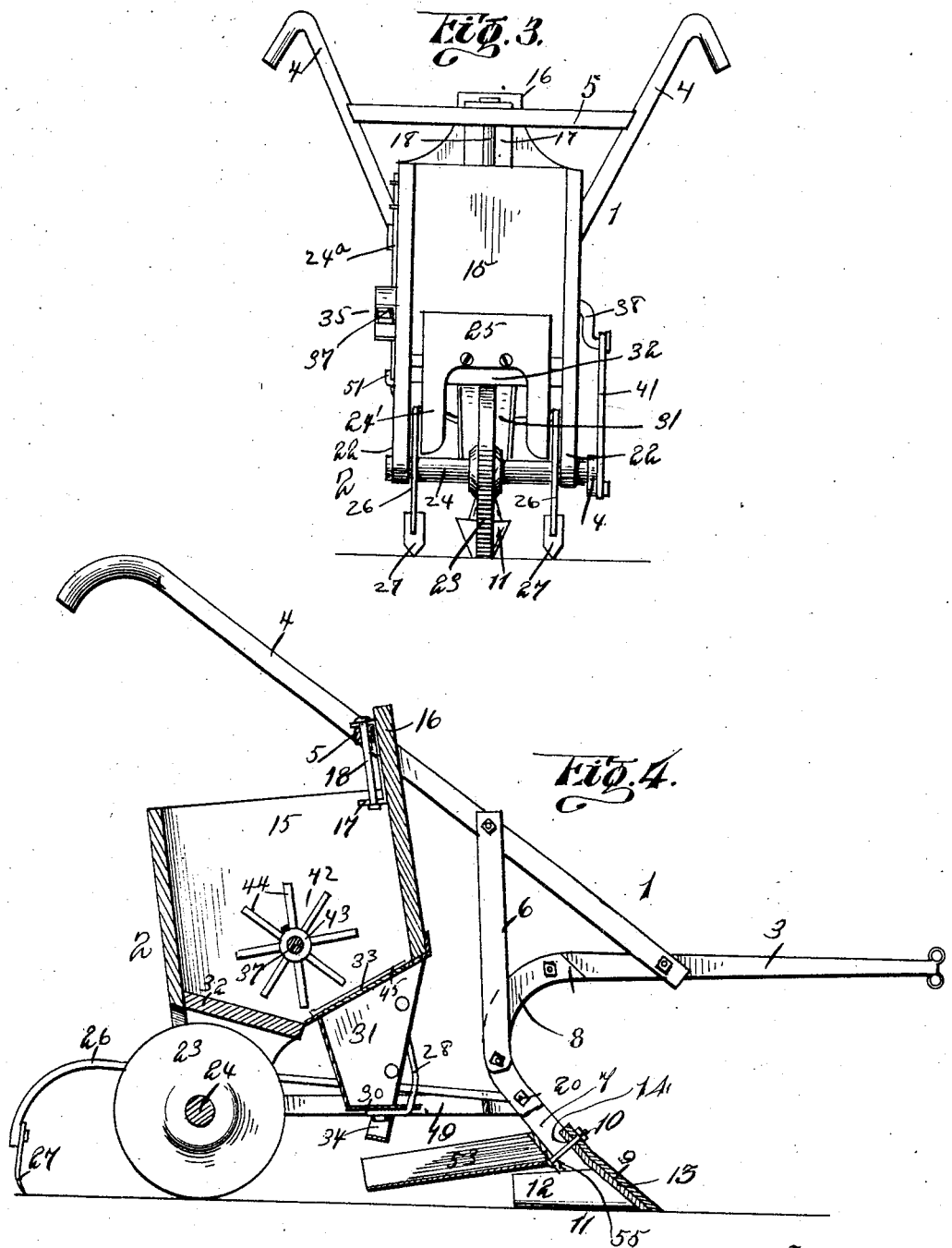

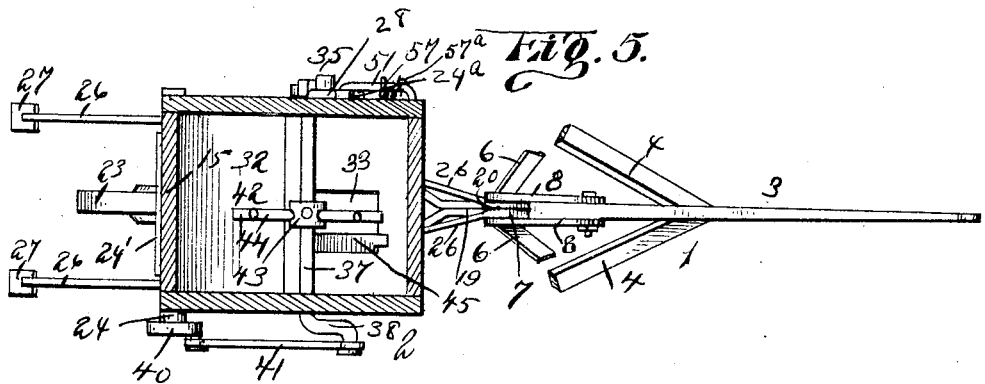

UNITED STATES PATENT OFFICE.

OLIVER PERRY SANFORD, OF DADEVILLE, ALABAMA, ASSIGNOR OF ONE-FIFTH TO J. H. ELLIE, ONE-FIFTH TO C. H. ELLIE, AND ONE-FIFTH TO S. O. SANFORD, OF DADEVILLE, ALABAMA.

SEEDER AND PLANTER.

SPECIFICATION forming part of Letters Patent No. 786,161, dated March 28, 1905.

Application filed August 25, 1904. Serial No. 222,150.

*To all whom it may concern:*

Be it known that I, OLIVER PERRY SANFORD, a citizen of the United States, residing at Dadeville, in the county of Tallapoosa and State of Alabama, have invented certain new and useful Improvements in Seeders and Planters; and I do declare the following to be a full, clear, and exact description of the invention, such as will enable others skilled in the art to which it appertains to make and use the same.

This invention relates to improvements in seeders and planters, and more particularly to that class of such machines adapted for either sowing or dropping cotton-seed, grain, or the like.

One object of my invention is to provide a simple and efficient seed-dropping mechanism which may be readily thrown out of operation when it is desired to sow seed with the machine.

Another object of my invention is to provide an improved means for mounting the said hopper or container and the covering-shovels to permit the same to adjust themselves upon inclined or uneven ground.

A further object of my invention is to improve and simplify the construction and operation of machines of this character, and thereby render them more durable and efficient in use and less expensive to manufacture.

With the above and other objects in view the invention consists of certain novel features of construction, combination, and arrangement of parts, as will be hereinafter more fully described, and particularly pointed out in the appended claims.

In the accompanying drawings, Figure 1 is an elevation of one side of my improved machine, showing in full lines the normal position of the seed-hopper and in dotted lines its elevated position. Fig. 2 is an elevation of the opposite side of the machine, showing in full lines the seed-dropping mechanism in its operative position and in dotted lines the same in the position in which it is secured when it is desired to use the machine for sowing seed. Fig. 3 is a rear end elevation of the machine. Fig. 4 is a vertical longitudinal sectional view. Fig. 5 is a horizontal sectional view taken on the line 5 5 of Fig. 1. Fig. 6 is a vertical transverse sectional view taken on the line 6 6 of Fig. 2. Fig. 7 is a detail view of the cut-off plate for the seed-hopper, and Fig. 8 is a detail view of the seed chute or trough.

Referring to the drawings by numeral, 1 denotes a suitable frame of a cultivator, plow, or the like, upon which my improved seed dropping and planting device 2 is mounted. As shown, said frame comprises the usual beam 3, having upwardly and rearwardly projecting handles 4, connected to each other by a cross-bar 5 and to the beam 3 by braces 6. Upon the front end of the beam 3 is a suitable clevis or draft connection, and the downwardly-curved rear portion is slotted, as at 7, to form two parallel bars or beams 8.

The usual cultivator-shovel 9 is secured upon said lower rear end of the beam by the usual heel-bolt 10, which extends through the slot 7. Said shovel 9 is adapted to open the furrow in which the seed is to be dropped or sown, and in order to enlarge and smooth the furrow I mount upon the bars 8, in rear of the shovel, a spreader device 11, which comprises a V-shaped metal plate having outwardly-flaring rear ends 12 and an angularly-disposed front plate 13, which is formed with an opening 14, through which a heel-bolt 10 is passed to secure the device together upon the lower end of the bars 8.

The device 2 comprises a rectangular hopper 15, which is mounted to move in a vertical plane independent of the frame 1. As shown, this mounting is effected by having the upper end of the hopper slidably connected to the cross-bar 5 and its lower end pivotally connected to the bars 8. As shown in Fig. 4 of the drawings, the upper sliding connection of the hopper is effected by securing upon the inner side of an upwardly-projecting portion 16 of the front wall of the hopper a bracket-plate 17, having substantially horizontal arms, through which and also through a centrally-disposed opening in the cross-bar 5 is passed a bolt 18. Said bolt 18 is carried by the plate 17 and has a free sliding movement in the cross-bar. The pivotal connection of the lower end of the hopper is effected by providing two curved links 19, the forward ends of which project into the slots 7 between the bars 8 and are pivoted upon a bolt 20, which is passed through alining openings in said bar. The rear ends of said links are pivotally connected, as at 21, upon depending portions or arms 22, formed upon the side walls of the hopper adjacent to its rear end. The hopper is supported upon the ground by means of a wheel or roller 23, which is secured upon a transverse shaft 24, journaled in bearings upon the lower ends of the arms 22. Said wheel 23 not only serves as a supporting-wheel for the hopper, but also for a drive or traction wheel for the dropping mechanism to be presently explained. Said wheel is disposed centrally between the arms 22, and upon each side of the wheel are depending guide-arms 24' of a guide-plate 25, which is secured upon the rear wall of the hopper, as clearly shown in Fig. 3 of the drawings. Said arms 24' are spaced from the arms 22 to receive and guide cultivator-beams 26, upon the rear lower ends of which are secured covering-shovels 27. Said beams 26 have their front converging ends pivoted upon the bolt 20 between the bars 8 and the links 19, so that said beams 26 may swing vertically in the spaces between the arms 22 and 24' and independent of each other in order that they may adjust themselves to uneven ground.

The seed-dropping mechanism comprises a swinging arm or lever 28, which has its upper end pivoted, as at 29, upon the outer face of one of the side walls of the hopper and its lower end bent inwardly and provided with a valve-plate 30, which is reciprocated in a seed-discharge tube or casing 31. Said tube 31 is in the form of a three-sided metal frame secured upon the under side of the inclined bottom 32 of the hopper beneath an outlet-opening 33 by means of a U-shaped metal brace 34, as clearly shown in Fig. 6 of the drawings.

The valve 30 is held normally in its closed position by a spring $24^a$, secured upon one of the side walls of the hopper and bearing against the arm or lever 28, which carries said valve. Said lever 28 is swung or oscillated to move the valve to its open position by means of a tappet device 35, which as here shown is in the form of a curved or S-shaped plate 36, secured upon one end of a transverse shaft 37, which extends through the side walls of the hopper and has upon its opposite end a crank 38. The shaft 37 is adapted to be oscillated to impart similar movement to the tappet-plate 36, so that the ends 36 of the tappet-plate will alternately engage the lever 28 and move it in one direction against the tension of its spring $24^a$ to open the seed-dropping valve, the said spring serving immediately thereafter to close the said valve, as will be understood. Any suitable means may be provided for oscillating said shaft; but I preferably connect its crank 38 to a crank 40 upon the outer end of the shaft 24 by means of a link or connecting-rod 41. Said crank 40 is of less length than the crank 38, as will be seen upon reference to Fig. 1 of the drawings, so that when the machine is moved forwardly and the wheel 23 rotated by reason of its engagement with the ground the crank 38 and its shaft 37 will be oscillated, while the crank 40 and its shaft 24 will rotate. Upon the shaft 37 within the body of the hopper is secured an agitator 42, which consists of a hub or collar 43, secured in place by a set-screw and having a series of radially and angularly projecting arms 44. By means of said agitator the seed or grain in the hopper above its discharge-opening 33 will be loosened and caused to discharge out of said opening.

In order to regulate the amount of seed discharged through the opening 33, I provide a cut-off plate 45, which is clearly shown in Fig. 7 of the drawings. Said plate is provided upon opposite edges with projecting lugs 46, which are adapted to engage and slide upon the inner or upper face of the bottom 32 of the hopper, and also with lugs 47, which engage the outer and under face of said bottom. The outer end of the plate is formed with a downturned portion 48, which forms a finger-piece by means of which the plate may be slid to open or close said opening. In order to retain the plate upon the bottom and secure it in any desired position, I provide a screw-bolt 49, which is passed through an opening in the bottom 32 and through a slot formed in said plate and has screwed upon its lower end a wing-nut 50.

When the machine is used for dropping seed, the spring $24^a$ holds the lever 28 in contact with the tappet-plate 36, and said lever is permitted to swing freely in a guide 51, secured upon the side wall of the hopper, so that the valve 30 will be reciprocated to its opened and closed positions and drop the seed or grain passing through the discharge-opening 33 and the tube 31 in piles upon a seed chute or trough 53. Said chute consists of a V-shaped plate 54, formed at one end with an apertured tongue 55. The chute is secured in an inclined position beneath the tube 31 by passing a bolt 10 through the opening in said tongue 55, which bears against the rear edges of the parallel bars 8, as shown. When it is desired to sow seed or distribute, the dropping mechanism is thrown out of operation by swinging the lever 28 forwardly and upwardly in the guide 51 and inserting a pin 56 in an opening 57, formed in the side wall of the hopper. Said pin, which is preferably connected to the guide 51 by a chain or flexible connection $57^a$, holds the lever 28 out of the path of the ends of the tappet-plate 36, so that when the latter is oscillated its motion will not be imparted to the lever, and hence the valve-plate 30 will be held in its opened position. When the machine is used for sowing the seed, the seed chute or trough 53 may, if desired, be removed.

From the foregoing description, taken in connection with the accompanying drawings, the construction and operation and the advantages of my invention will be readily understood without requiring a more extended explanation, and it will be seen that by mounting the hopper to slide and swing upon the frame 1 it will adjust itself to irregular or uneven ground and that by pivotally mounting the covering-shovel beams independently they may also adjust themselves to inclined or uneven ground. It will be seen that the dropping mechanism is very simple and effective and that it may be readily thrown into and out of operation.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the class described, a hopper having a discharge, a shaft having a stirring device in the hopper and a tappet on one side of the hopper, means to actuate said device, a valve for the discharge, a lever to operate said valve, and a spring to engage said lever with the tappet, said spring and tappet coacting to impart reciprocating motion to said lever and valve, substantially as described.

2. In a machine of the character described, the combination of a hopper, a discharge therefor, a valve for said discharge, a lever for operating said valve, a shaft extending through said hopper, a double-end tappet upon said shaft and adapted to coact with said lever, a crank upon said shaft, a second shaft, a traction-wheel upon the latter, a crank upon the latter-mentioned shaft of less length than the crank upon the first-mentioned shaft, and a rod connecting said cranks, substantially as described.

3. The combination of a hopper, a discharge therefor, a valve for said discharge, an element for operating said valve, a shaft, a double-end tappet upon said shaft for operating said element, a crank upon said shaft, a drive-shaft, a crank on said drive-shaft of less length than the first-mentioned crank, and a connection between said cranks, whereby when said drive-shaft is rotated said tappet-shaft will be oscillated, substantially as described.

4. The combination of a hopper, a discharge therefor, a valve for said discharge, an element for operating said valve, a double-end oscillatory tappet for operating said element, and means for holding said element out of the path of said tappet, substantially as described.

5. In a machine of the class described, the combination of a suitable frame, a hopper mounted thereon, having depending arms, a guide-plate carried by said hopper and depending between its arms, and shovel-beams pivotally connected to said frame and adapted to swing freely and independently between said arms and said guide, substantially as described.

6. In a machine of the class described, the combination of a suitable frame, a hopper slidably connected to said frame and having depending arms, links pivotally connected to said arms, a supporting-wheel for said hopper mounted between said arms, a guide upon said hopper, covering-shovel beams projecting between said arms and said guide, and a pivot for connecting the forward ends of said beams and said links to said frame, substantially as described.

7. In a machine of the class described, the combination of a hopper having a discharge-opening in its bottom, a sliding cut-off plate having lugs upon opposite edges to project through said opening and engage the inner face of said hopper-bottom, and lugs upon said edges to engage the outer face of said hopper-bottom, and means for adjustably securing said plate upon said bottom, substantially as described.

In testimony whereof I have hereunto set my hand in presence of two subscribing witnesses.

OLIVER PERRY SANFORD.

Witnesses:
F. A. SALMON,
D. A. BARNEY.